(12) United States Patent
Lenhart et al.

(10) Patent No.: US 6,598,816 B1
(45) Date of Patent: Jul. 29, 2003

(54) CHIP DETANGLER

(75) Inventors: Thomas W. Lenhart, Rockton, IL (US); John L. Dahms, Waukesha, WI (US)

(73) Assignee: Barnes International, Inc., Rockford, IL (US)

( * ) Notice: Subject to any disclaimer, the term of this patent is extended or adjusted under 35 U.S.C. 154(b) by 477 days.

(21) Appl. No.: 09/714,686

(22) Filed: Nov. 16, 2000

(51) Int. Cl.[7] .............................. B30B 3/00; B02C 13/02
(52) U.S. Cl. .................................. 241/260.1; 241/247
(58) Field of Search .............................. 241/260.1, 247

(56) References Cited

U.S. PATENT DOCUMENTS

| 5,328,611 | A | | 7/1994 | Lenhart | 210/393 |
|---|---|---|---|---|---|
| 5,496,470 | A | | 3/1996 | Lenhart | 210/222 |
| 5,553,534 | A | * | 9/1996 | Soavi | 100/145 |
| 5,983,910 | A | * | 11/1999 | Berger et al. | 134/104.4 |
| 6,004,470 | A | * | 12/1999 | Abril | 210/776 |
| 6,174,446 | B1 | * | 1/2001 | Andresen et al. | 210/744 |
| 6,343,610 | B1 | * | 2/2002 | Berger et al. | 134/63 |

* cited by examiner

*Primary Examiner*—Williams Hong
(74) *Attorney, Agent, or Firm*—Leydig, Voit & Mayer, Ltd.

(57) ABSTRACT

A chip detangler is provided for a machine having a discharge trough for collecting fluid containing metal chips. An auger disposed along a longitudinal axis of the trough advances the fluid and chips downstream through an exit area. The detangler preferably comprises a snagging bar fixed relative to the machine and disposed at least partially within the trough to engage nests of chips traveling past the snagging bar. The forces induced by the auger tears apart nests engaged with the snagging bar into smaller, more suitable sizes.

18 Claims, 4 Drawing Sheets

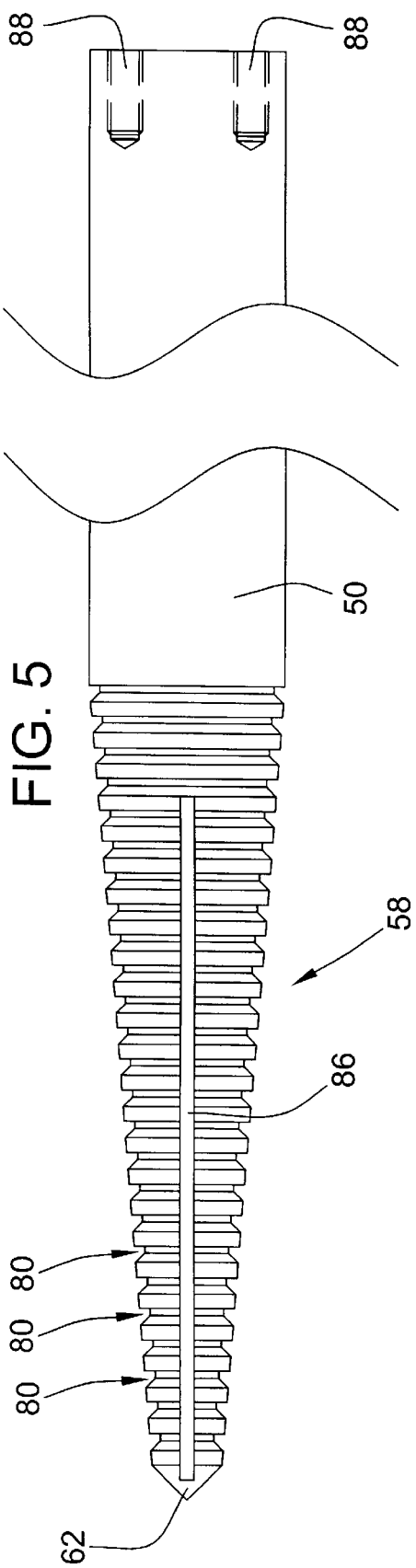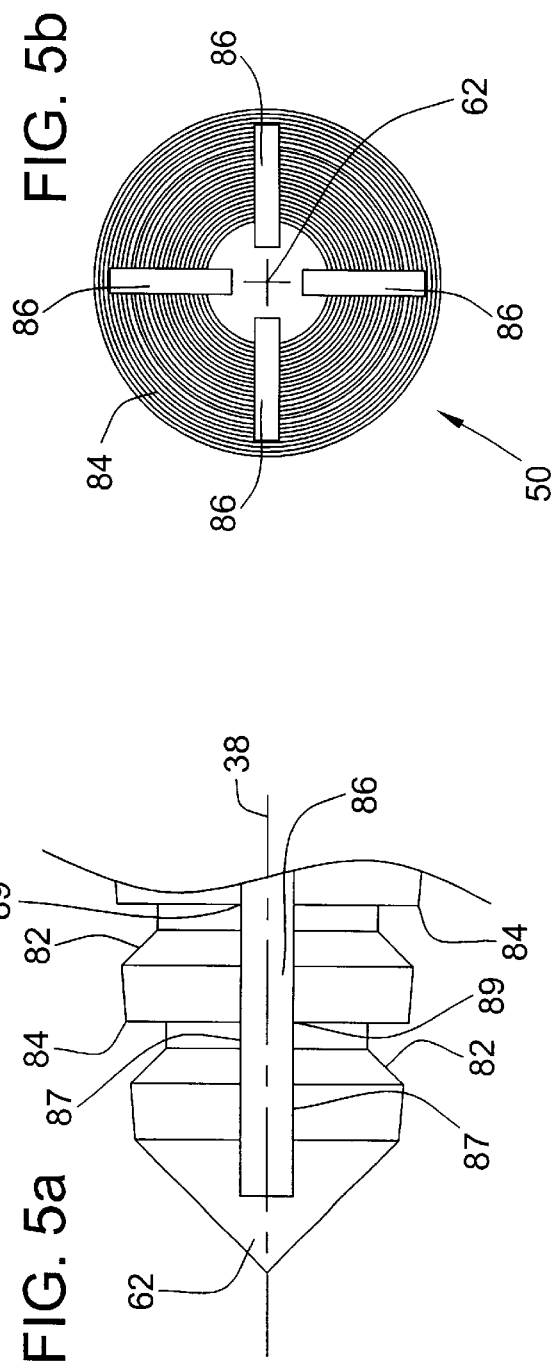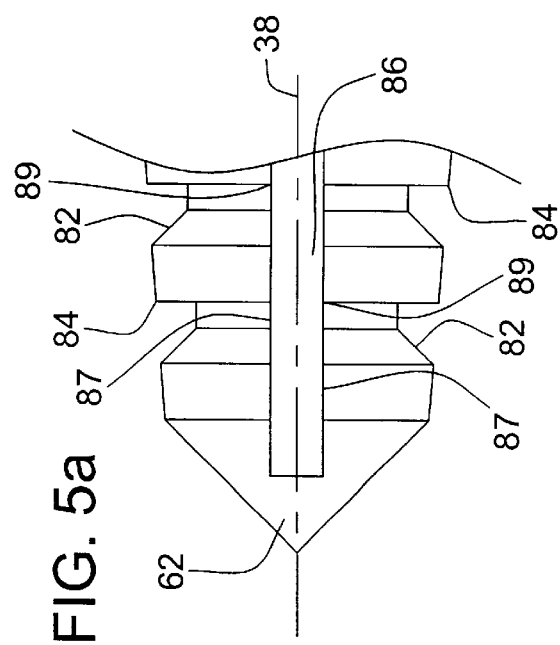

CHIP DETANGLER

FIELD OF THE INVENTION

The present invention relates generally to machine tool coolant collection and recovery, and more particularly relates to apparatus for breaking up nests of chips in the coolant.

BACKGROUND OF THE INVENTION

Machining apparatus are commonly used to cut, mill, drill, or otherwise work various metal stock. These machines produce significant quantities of metal particles or chips, and often use a liquid such as machine tool coolant to sweep away the chips. A recycling system is used to deliver the dirty fluid to a filtering device which separates the metal particles from the coolant, and then returns the clean coolant to the machine center for further use. An exemplary filtering device is described in U.S. Pat. No. 5,328,611 held by the assignee of the present invention, which discloses a rotary drum type separator for filtering the metal particles.

In situations where a number of machines are used in a common area, the recycling system may employ a single filtering device to service all of the machine centers in that area. The centralized filtration device receives dirty coolant from a delivery system of each machine and returns filtered coolant back to each machine via a return system. Each machine center includes a collection and delivery system for sending fluid containing particles to the filtering device. A machine center includes a discharge trough for collecting the fluid and metal particles from the machine, and an auger within the trough for moving the fluid and particles through the trough for discharge. A typical collection and delivery system includes a container or sump for collecting the dirty fluid from the trough, and a sump pump for delivering the dirty fluid to the centralized filtering device.

A common problem associated with these delivery systems is the failure of the sump pump to deliver dirty fluid to the filtering device due to the pump becoming blocked or clogged with large collections of metal particles. High-speed machines operate at fast cutting rates and quickly produce large quantities of metal chips. The chips/particles come in all shapes, sizes and forms, such as strings or coils. The metal chips and particles easily become intertwined in tangled webs or nests of numerous chips. Freshly cut chips include sharp edges and corners which easily attach to other chips, creating a strong enmeshed nest of metal chips. These problems can become even more severe when aggressively machining relatively soft metal such as aluminum. These nests of particles become too large to enter the inlet or otherwise be handled by the sump pump, causing it to become clogged and backing up the delivery system portion of the recycling system.

One solution to this problem is the use of chip shredders. These shredders employ rotating cutters to break apart these nests of particles as well as the chips themselves. While this solution is certainly effective, it is an expensive one. Chip shredders alone cost in the range of six thousand to ten thousand dollars, representing a substantial portion of the overall cost for the system. A chip shredder itself is a complex piece of machinery, which requires maintenance and repair throughout its life. Furthermore, these shredders are too large to fit on the end of a machine tool, and usually require special adaptation for use with the machines and the delivery of dirty fluid to the filtration system. Finally, these shredders are designed to handle metals of all types, including hard metals such as steel. However, for some soft metals such as aluminum, a chip shredder is simply excessive for the amount of work required to break apart the nest of metal chips.

SUMMARY OF THE INVENTION

In light of the above, a general aim of the present invention is to provide an economical, compact and simple chip detangler capable of being effectively associated with a discharge trough of a machine.

In that regard, it is also an object of the present invention to provide a chip detangler of simple design that eliminates complex machinery and additional moving parts.

A further object of the present invention is to provide a chip detangler that is configured to mount to the machine and functionally integrate with the existing collection and delivery portion of the recycling system.

Yet another object of the present invention is to provide a chip detangler that is adaptable for mounting to different machines.

In accordance with these objects, the present invention provides a chip detangler for a machine having a discharge trough for collecting fluid containing metal chips. The machine also includes an auger in the trough for advancing the fluid and chips downstream through an exit area for discharge. The detangler comprises a snagging bar fixed with respect to the machine and mounted at least in part inside the discharge trough. At least a portion of the snagging bar has an irregular surface formed with a plurality of surface discontinuities sized and positioned relative to the auger to snag chips passing through the exit area.

It is an aspect of the present invention that the chip detangler may further include a shredder blade fixed relative to the machine, the shredder blade having surface discontinuities to snag chips passing through the exit area. Preferably, the surface discontinuities comprise teeth extending towards the snagging bar for engaging metal chips passing thereby.

It is also an aspect of the present invention that the snagging bar surface discontinuities comprise a series of annular grooves to provide a plurality of exposed annular edges for engaging the points, edges and corners of chips passing thereby. Another related aspect of the present invention is to provide the snagging bar with further discontinuities in the form of flutes extending downstream to create corners and edges for engaging particles passing thereby. The flutes are disposed substantially transverse to the annular grooves such that the combination provides a plurality of differently disposed edges and corners for engaging the particles.

It is yet another aspect of the present invention to dispose the snagging bar generally co-axial with the auger in the trough to reduce the area through which the fluid and chips pass, forcing nests of particles to engage the snagging bar. A suppressor plate is preferably employed and extends between the side walls of the trough to close a top side of the trough and keep the chips proximate the snagging bar.

Other objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention, and together with the description serve to explain the principles of the invention. In the drawings:

FIG. 5 is a side view of the snagging bar of the chip detangler illustrated in FIG. 3;

FIG. 5a is an enlarged view of the distal end of the snagging bar illustrated in FIG. 5;

FIG. 5b is an end view of the snagging bar illustrated in FIG. 5; and

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE PREFERRED EMBODIMENT

Figure 1:
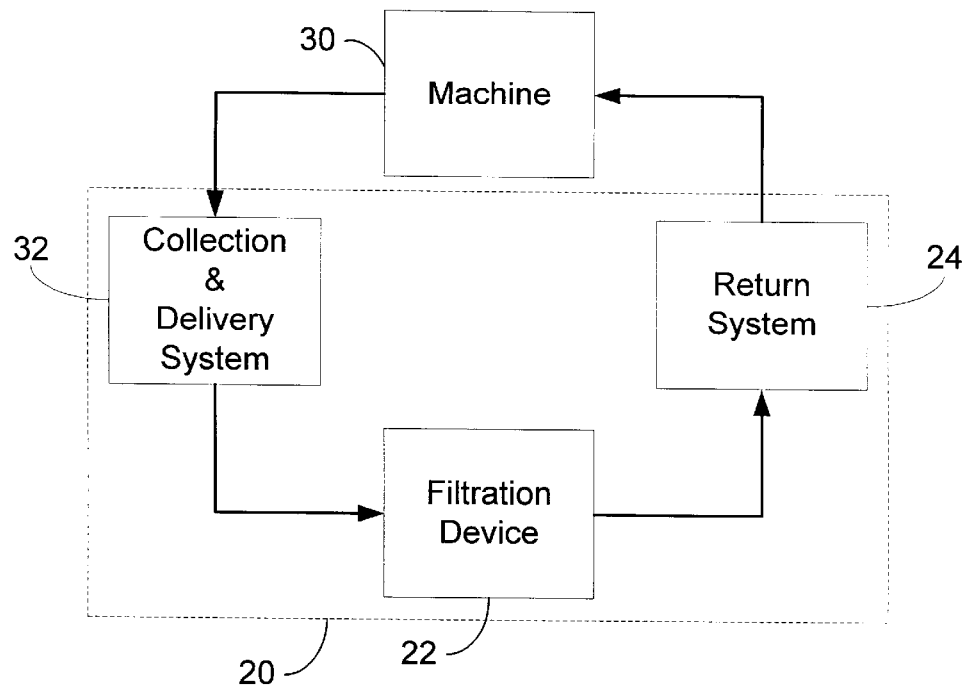
FIG. 1 is a diagrammatic view of a machine and associated recycling system.

Referring now to the drawings, for purposes of illustration, the present invention will be described in connection with a machining apparatus 30 and associated recycling system 20 diagramatically illustrated in FIG. 1. The machining apparatus 30, such as an NC lathe or other machining center, produces metal chips carried by a fluid, typically a machine tool coolant. The dirty coolant can be recycled, whereby the chips are separated from the coolant and the clean coolant is returned for further use. As shown in FIG. 1, the recycling system 20 includes a collection and delivery system 32 that receives dirty coolant from the machine 30, and delivers the same to a filtration device 22. The filtration device 22 separates the chips from the fluid, and returns clean fluid to the machine 30 via a return system 24. The chips are collected for disposal or recycling. For a single machine 30, the recycling system 20 may be formed as a part of the machine 30 and wholly enclosed therein, although the recycling system 20 or a portion thereof may be located externally from the machine 30, such as the collection and delivery system 32 or the filtration device 22.

Figure 2:
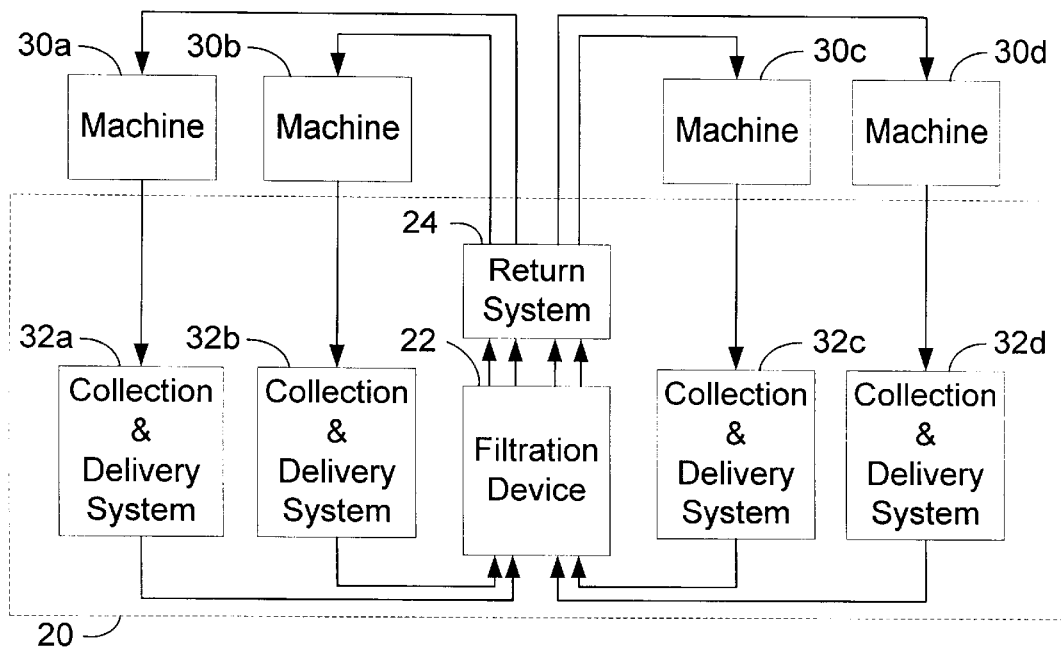
FIG. 2 is a diagrammatic view of a plurality of machines and a centralized recycling system.

For example, in some manufacturing situations it is preferable for the recycling system 20 to employ a single filtration device 22 for an entire area having many machines 30. Such a situation is diagrammatically illustrated in FIG. 2, wherein a plurality of machines 30a, 30b, 30c, 30d, etc. are serviced by a common recycling system 20 having a single filtration device 22. Each of the machines 30a, 30b, 30c, 30d have an associated collection and delivery system 32a,32b,32c,32d for receiving dirty coolant and forwarding the same to a filtration device 22. The filter 22 separates chips from the coolant, and returns clean coolant to the machines 30a, 30b, 30c, 30d via a return system 24. The present invention is also well suited for this type of system.

Each machining apparatus 30 includes a defined exit area for discharge, associated with a driven mechanism of some type which flushes or drives the mixture of chips and coolant through the defined exit area. The chip detangler of the present invention is then positioned in the exit area to snag or catch the large chip masses in the outlet, and cooperate with the driving mechanism to tear, break or otherwise shred the large masses. The chip detangler is sufficiently enclosed in the exit area to snag the large masses of particles and refuse to let them through until they are small enough for further processing. In its preferred form, a machining apparatus is operatively linked to a collection and delivery system which includes a discharge trough having a longitudinal axis. The term trough is meant to include any channel, receptacle or depression capable of collecting fluid or other material such as metal chips. The driven mechanism which supplies motive power is typically supplied in whole or in part by an auger positioned along the longitudinal axis.

Figure 3:
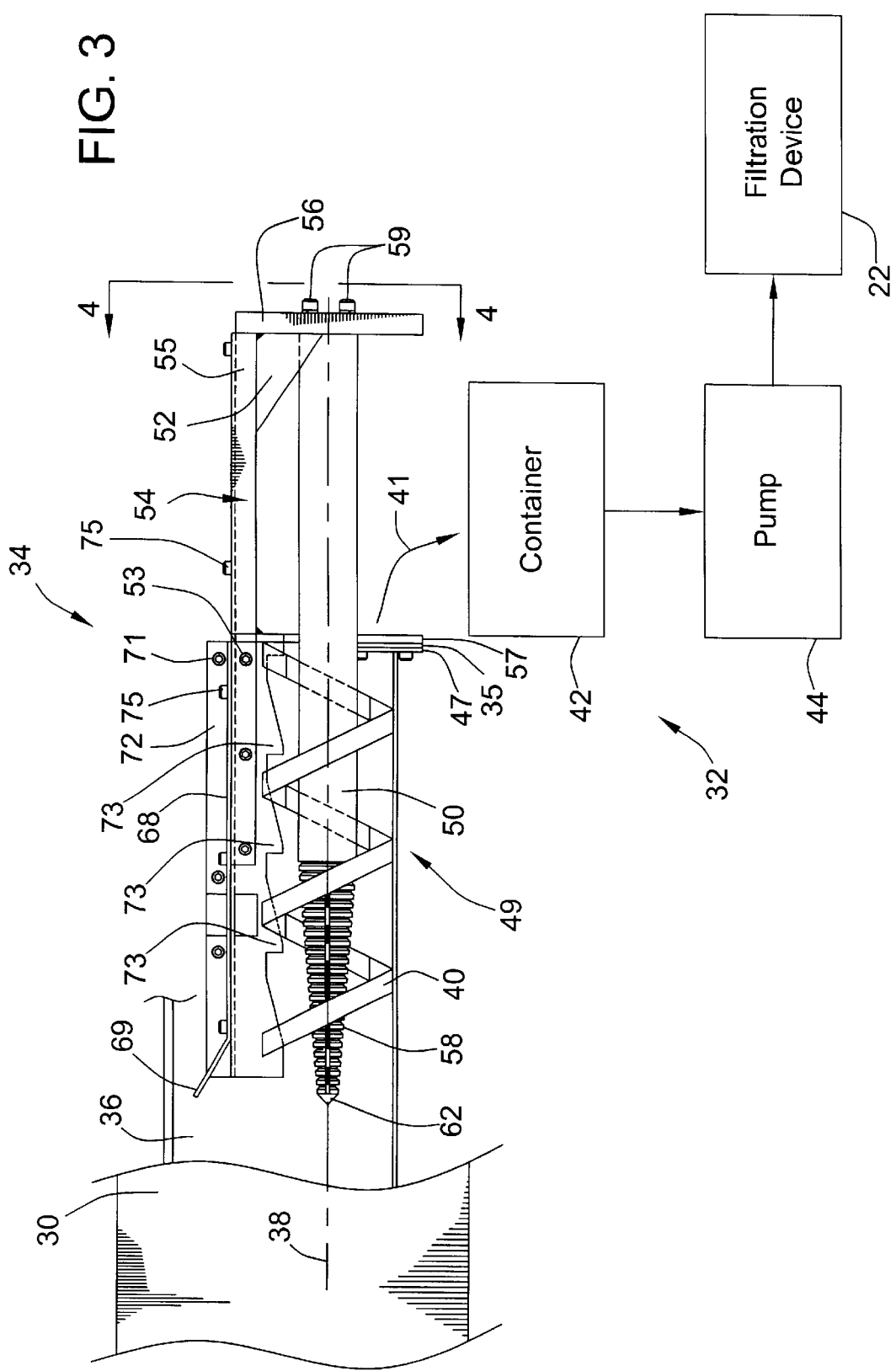
FIG. 3 is a side view of an embodiment of the chip detangler constructed in accordance with the teachings of the present invention.

FIG. 3 illustrates one such embodiment of the chip detangler 34 in accordance with the teachings of the present invention. In the illustrated embodiment, the discharge trough 36 protrudes from the machine 30 to define an exit area 49, while an open center auger 40 is rotated by means (not shown) to move coolant and particles in the trough 36 along the longitudinal axis 38 for discharge from the machine 30. The dirty coolant is discharged from the exit area 49 as indicated by arrow 41, and enters a container 42. A pump 44 delivers the dirty coolant in the container 42 to a filtration device 22. Depending on the particular machining apparatus 30 and the type of work it is doing, metal particles or chips of all shapes and sizes are formed. These particles usually contain sharp edges and corners that easily attach to other particles. Coolant is commonly used to keep the machine parts and metal being worked at acceptable temperatures, and is also used to flush the various particles formed by a machining process through the machine 30 and into the discharge trough 36. During this travel, the particles continue to attach to each other, forming tangled webs or nest of chips that can block the inlet or other portions of the pump 44. Sometimes large nests collect in the machine and are periodically flushed by an operator with hose and brush during cleanup cycles.

Figure 4:
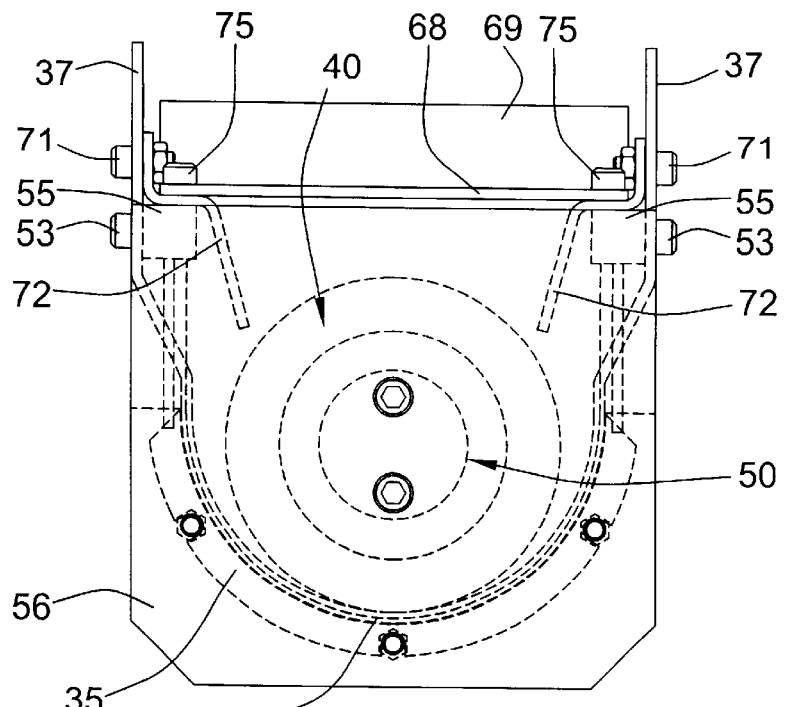
FIG. 4 is an end view of the chip detangler illustrated in FIG. 3.

In accordance with an aspect of the present invention, the chip detangler 34 includes a snagging bar 50 disposed within the discharge trough 36 and exit area 49, and preferably disposed within the open center of the auger 40, to tear apart large collections or nests of particles which could clog the pump 44 due to their size. As shown in FIGS. 3 and 4, the snagging bar 50 is partially disposed within the trough 36, and includes a tapered head 58 leading to a distal end 62, the end 62 forming a sharp pointed tip. The tapered head 58 includes an irregular surface formed with a plurality of surface discontinuities sized and positioned to snag the points, edges and corners of chips passing through the exit area. As such, the force of the auger 40 tears the nest apart as the portion of the nest not caught by the snagging bar 50 continues toward the end of the trough 36.

The driven mechanism in the illustrated embodiment is shown as an open center auger 40, with the snagging bar 50 positioned relative to the auger 40 and trough 36 to cause engagement of nests with the snagging bar 50. Nonetheless, it will be understood by those skilled in the art that the driven mechanism may also comprise other rotating bodies such as a closed center auger. In the case of a closed center auger 40, the snagging bar 50 would preferably comprise a structure which surrounds the auger and reduces the area between the auger and the trough walls, such as a tubular member having an internal surface including surface discontinuities sized and positioned to snag the chips passing through the exit area. In this case, the external surface could also include surface discontinuities for snagging metal particles or chips. Similarly, the snagging bar 50 could also comprise a plurality of smaller bars spaced about the periphery of the closed center auger 40, each of the bars including an irregular surface formed with a plurality of surface discontinuities to ensnare the points, edges and corners of metal chips passing thereby. It will also be understood that depending on the particular driven mechanism, a snagging bar can be envisioned and encompasses any structure which reduces the area through which the metal chips can pass, primarily the area or space within the trough that is not filled by the auger 40 or other driven mechanism, to engage metal chips.

To further facilitate the detangling process, the preferred embodiment includes a pair of shredder blades 72 that extend into the trough 36, and specifically the exit area 49, for engaging chips and particles of a nest. The shredder blades 72 are connected to the trough 36 via bolts 71, and are shaped such that they extend downwardly and inwardly towards the auger 40 and snagging bar 50. Longitudinal edges of the shredder blades 72 also include discontinuities, namely teeth 73 (FIG. 3) for engaging metal chips and particles. These teeth 73 engage a nest much like the snagging bar 50 does, while the auger 40 forces the remainder of the nest downstream, resulting in the nest being torn apart.

In essence, the snagging bar 50 and shredder blades 72 hold a portion of a particle nest in place, while the auger 40 pulls or pushes on an opposing portion of the nest, putting the nest in tension. Under this stress, the chips themselves will bend, break and tear due to tensile and sheer forces, and the interconnection of chips will also fail, resulting in the entire nest tearing apart. The ability of the snagging bar 50 and the shredder blades 72 to engage and hold chips and particles in place is due to the surface discontinuities in the tapered head 58 and teeth 73. Namely, these portions include large number of sharp edges and corners that are disposed to engage the edges and corners of the particles forming the nests traveling downstream.

As shown in FIGS. 5, 5*a* and 5*b*, in the preferred embodiment the outer surface of the tapered head 58 includes a plurality of annular grooves 80. As best seen in FIG. 5*a*, each groove 80 forms a sharp annular edge 84 that is exposed for ensnaring and engaging metal chips. The side walls 82 of each groove 80 are angled upstream relative to longitudinal axis 38, the axis 38 being horizontally disposed in the figures. In the illustrated embodiment, the side walls 82 are angled at about 45° relative to vertical, the side walls 82 pointing upstream as they extend radially outward. This construction results in a sharp annular edge 84, which is intentionally not deburred so that the edge is sharp for engaging nests. It can also be seen that the distal end 62 of the snagging bar 50 terminates at a sharp pointed tip to break into the nest of chips.

As also shown in FIGS. 5, 5*a* and 5*b*, the tapered head 58 is preferably provided with a plurality of flutes 86 extending downstream. In the illustrated embodiment, four flutes 86 are equidistantly spaced about the outer surface of the tapered head 58. It will be recognized that the opposing sides of each flute 86 creates edges 87 which extend downstream. Each edge 87 follows the contour of the head's outer surface, which includes the plurality of distinctly shaped annular grooves 80. Therefore, each flute 86 not only creates multiple sharp edges 87 that are distinctly disposed, but also results in a plurality of sharp corners 89 where the flute 86 meets an annular edge 84, since the flutes 86 are disposed substantially transverse to the grooves 80. It can therefore be seen that the tapered head 58 of the snagging bar 50 includes a discontinuous surface having numerous sharp edges and corners, all of which serve to potentially engage and hold a chip or particle of an entangled nest. Especially with the combination of the shredder blades 72 and snagging bar 50, an extremely strong grip on a portion of a nest allows the auger 40 to induce tensile forces on the nest and its chips, breaking and tearing the nest apart into sizes suitable for the pump 44. It will be recognized by those having skill in the art that the specific surface discontinuities of the snagging bar and shredder blade, such as the annular grooves, flutes and teeth, are merely examples of the many forms which provide sharp points, edges, hooks, corners or other engaging structures for snagging metal chips.

The tapered head 58 slopes at a relatively shallow angle beyond the tip 62, preferably in the range of about 1° to 15°, depending on the particular machine 30, its trough 36 and auger 40, as well as the size of the snagging bar 50. For example, the figures represent a bar having a 1.75 inch diameter, wherein the tapered head 58 slopes at about 4.5°. This shallow angle provides a relatively long tapered head 58 having a large amount of surface area for engaging nests of particles. It will be recognized that the size of the snagging bar 50 relative to the auger 40 and trough 36 must be selected such that the space between these elements is small enough to break apart nests that would block the pump 44 if not detangled and torn apart into smaller pieces. Thus, the snagging bar 50 effectively reduces the area through which the nest may pass, forcing the nests of particles to engage the snagging bar 50.

It will be understood by those having skill in the art that the type of material from which the chips and particles are formed influences certain aspects of the design of the chip detangler 34. First, the higher the tensile strength of the chip material, the stronger the nest of particles will be, and larger forces will be required to tear such a nest apart. Steel, for example, would produce a nest requiring large forces to be torn apart, while soft metals such as aluminum will require much lower forces. The magnitude of the tearing forces placed on a nest of chips depends upon the type and strength of the auger 40, as well as the ability of the snagging bar 50 and shredder blade 72 to hold metal chips. Most modern augers are powerful enough to break apart nests of metal, including those having high tensile strength. Further, the numerous points, edges and corners of the chip detangler 34 give it excellent gripping ability that is well suited for all types of chip material. Thus the snagging bar must be attached to the machine center in a manner that can withstand the forces induced by breaking apart nests of chips via the auger and snagging bar.

Accordingly, in the preferred embodiment a weldment 54 is used to attach the snagging bar 50 to the machine 30. The weldment imparts sufficient structural rigidity to the snagging bar 50 so that the detangler 34 may work on nests of low and high tensile strength material. Referring again to the embodiment illustrated in FIGS. 3 and 4, the weldment 54 is attached to the trough 36 via bolts 53. The weldment 54 includes a pair of laterally spaced top connection bars 55 attached to the sides 37 of the trough 36. A rear plate 56 is attached to the top connection bars 55 and held relative thereto by a corner plate 52, all of which is preferably connected via welding. The rear plate 56 supports the snagging bar 50 by way of bolts 59 extending into mounting holes 88 (see FIG. 5) of the bar 50. The weldment 54 also includes a mid plate 57 to support the end of the trough 36. The end of the trough 36 includes a flange 35 which is sandwiched between the mid plate 57 and a retainer plate 47, the three elements being connected via bolts 39. Thus the weldment 54 is attached to the machine's trough 36, thereby firmly and rigidly securing the weldment 54 and snagging bar 50 to the machine 30.

It can be seen in FIGS. 3 and 4 that a suppressor plate 68 is preferably attached to the connection bars 55 via bolts 75 to close a top side of the trough 36. As nests of particles are forced against the snagging bar 50, the portion of the nest not engaged with the detangler 34 tends to deflect or move away from the bar 50. Thus the suppressor plate 68 may be employed to keep nests of particles proximate the snagging bar 50, as well as the shredder blades 72 and auger 40. The suppressor plate 68 extends upstream from the end of the trough, and is sized to extend a distance corresponding with the distance the snagging bar 50 projects into the trough 36 and exit area 49. The upstream end of the plate 68 includes and angled end 69, which is angled away from the snagging bar 50 and auger 40 to provide a widened entrance and guide the particles and nests towards the bar 50 and auger 40 to be torn apart.

Figure 6:
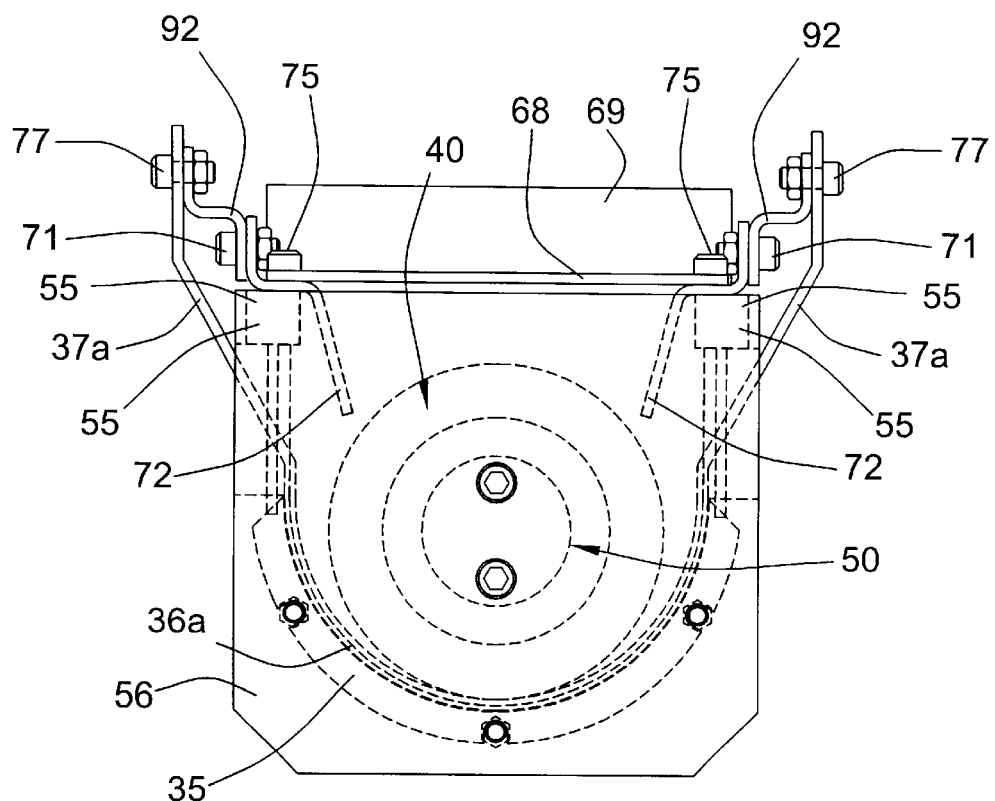
FIG. 6 is an end view of an another embodiment of the chip detangler constructed in accordance with the teachings of the present invention.

Turning to FIG. 6, an end view of an embodiment of the chip detangler 34 is shown whereby the invention may be adapted for alternately shaped discharge troughs, trough 36a being illustrated in the figure. Trough 36a includes side walls 37a spaced further apart than the side walls 37 of FIG. 4. Therefore, extension flanges 92 are employed to attach the weldment 54 and shredder blades 72 to the machine 30 via trough 36a. The extension flanges 92 are attached to the trough's side walls 37a via bolts 77, and the flanges 92 extend inwardly and downwardly to a position suitable for attaching the shredder blades 72. The blades 72 are attached in the same position relative to the auger 40 and snagging bar 50 like they were in FIG. 4. In this instance, the top connection bars 55, rather than attaching to the flange 36 by bolts 53 as shown in FIGS. 3 and 4, are attached to the shredder blades 72 via bolts 75. It can be seen that bolts 75 are the same bolts used in the prior (and current) embodiment to fasten supressor plate 68 to the weldment 54. It will be apparent to those skilled in the art that many different mounting mechanisms and structures may be employed depending on the particular trough of a given machine, including the shape of the extension flanges 92, the order of attachment, and the use of bolts, welds, screws and other well known fasteners. For example, the mounting structure may be attached to portions of the machine other than the trough, or the trough itself may be provided with additional structural support.

Therefore, one of ordinary skill in the art can readily see from the foregoing description that the chip detangler of the present invention provides an economical chip detangler for a machine to tear apart nests of metal chips upstream of a sump pump that would otherwise clog the pump. The chip detangler is of simple design and eliminates complex machinery. It will be recognized by those having skill in the present art that the detangler 34 according to the present invention does not require any moving parts, exception being made for the auger 40 which is a pre-existing element of the machine which functionally interacts with the collection and delivery portion 32 of the recycling system 20. The detangler 34 is thus simple and economical in nature, as well as easy to install, repair and replace, if necessary. The chip detangler is configured to mount directly to the machine by cooperating with the existing troughs, and is adaptable for mounting to different machines and troughs. The chip detangler is a simple and economical solution to efficiently prevent a pump from becoming clogged from nests of metal chips and particles. It will be understood that while the present invention has been described and illustrated with reference to machining centers, it is also applicable to any device which produces a nest or web of entangled material.

The foregoing description of various preferred embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A chip detangler for a machine having a discharge trough for collecting fluid containing metal chips, a driven mechanism in the trough for advancing the fluid and chips downstream through an exit area for discharge, the detangler comprising:

at least one shredder blade positioned outside the driven mechanism and having surface discontinuities sized and positioned to snag chips passing through the exit, a snagging bar configured to be fixed with respect to the machine and configured to be mounted at least in part inside the discharge trough, at least a portion of the snagging bar having an irregular surface formed with a plurality of surface discontinuities sized and positioned relative to the driven mechanism to snag chips passing through the exit area.

2. The chip detangler of claim 1, the driven mechanism being an open center auger, wherein the snagging bar is mounted at least partially inside the open center of the auger.

3. The chip detangler of claim 1, wherein an end of the snagging bar has a tapered head, the tapered head having an irregular surface formed with a plurality of surface discontinuities.

4. The chip detangler of claim 3, wherein the tapered head is sloped at a shallow angle to provide a large surface area for engaging metal chips.

5. The chip detangler of claim 1, wherein the snagging bar surface discontinuities comprise a series of annular grooves forming exposed annular edges to snag metal chips.

6. The chip detangler of claim 5, wherein the annular grooves include side walls that are angled upstream relative to the longitudinal axis.

7. The chip detangler of claim 5, wherein the snagging bar surface discontinuities further include a plurality of flutes extending downstream, each of the flutes having a pair of side walls that, in conjunction with the annular grooves, form a plurality of edges and corners that snag metal chips.

8. The chip detangler of claim 1, wherein the shredder blade surface discontinuities comprise a plurality of teeth extending towards the auger to snag metal chips.

9. In The chip detangler of claim 1, wherein the snagging bar is connected to the machine by a weldment attached to the trough, the weldment disposing the snagging bar concentrically with the driven mechanism and trough.

10. The chip detangler of claim 1, further comprising a suppressor plate extending between side walls of the trough to close a top side of the trough at the exit area and keep metal chips proximate the snagging bar.

11. A chip detangler for a machine having a discharge trough for collecting fluid containing metal chips, an auger in the trough for advancing the fluid and chips downstream through an exit area for discharge, the detangler comprising:

- a shredder blade fixed with respect to the machine and positioned outside the auger, the shredder blade having surface discontinuities sized and positioned to snag driven chips passing through the exit area,
- a snagging bar fixed with respect to the machine and mounted at least in part inside the trough, at least a portion of the snagging bar having an irregular surface formed with a plurality of surface discontinuities sized and positioned to snag driven chips passing through the exit area, the force of the auger inducing tearing forces on nests of chips engaged with the snagging bar to tear the nests into smaller sizes for discharge from the exit area.

12. The chip detangler of claim 11, wherein the snagging bar has a tapered head having an irregular surface having surface discontinuities.

13. The chip detangler of claim 12, the auger being an open center auger, wherein the tapered head is mounted at least in part inside the open center of the auger.

14. The chip detangler of claim 11, wherein the snagging bar is positioned relative to the auger and trough to reduce the cross-sectional area through which the fluid and particles can pass.

15. The chip detangler of claim 11, wherein the machine is associated with a recycling system having a container, a pump and a filtration device, the container for receiving discharged fluid and chips, and the pump for transporting the fluid and chips from the container to a filtration device.

16. The chip detangler of claim 15, wherein the force of the auger tears apart nests engaged with the snagging bar into smaller sizes suitable for the pump to transport the fluid and particles to the filtration device for recycling.

17. A chip detangler for a machining apparatus having a discharge trough for collecting fluid containing metal chips, an auger in the trough for advancing the fluid and chips downstream through an exit area for discharge, the detangler comprising:

- a snagging bar fixed with respect to the machine and mounted at least in part inside the discharge trough, the snagging bar having a tapered head pointed upstream to engage nests of metal chips traveling downstream, the tapered head having a series of annular grooves forming exposed annular edges to engage metal chips; and
- a shredder blade attached to the trough and having a plurality of teeth extending downwardly and inwardly towards the snagging bar to engage metal chips.

18. The chip detangler of claim 17, wherein the snagging bar and shredder blade are positioned adjacent the auger, the force of the auger tearing apart nests of chips engaged with the snagging bar or shredder blade.

\* \* \* \* \*